May 4, 1954
C. W. VOGT
2,677,317
METHOD FOR MAKING BUNDLES OF ENWRAPMENTS
Filed July 2, 1949
5 Sheets-Sheet 1
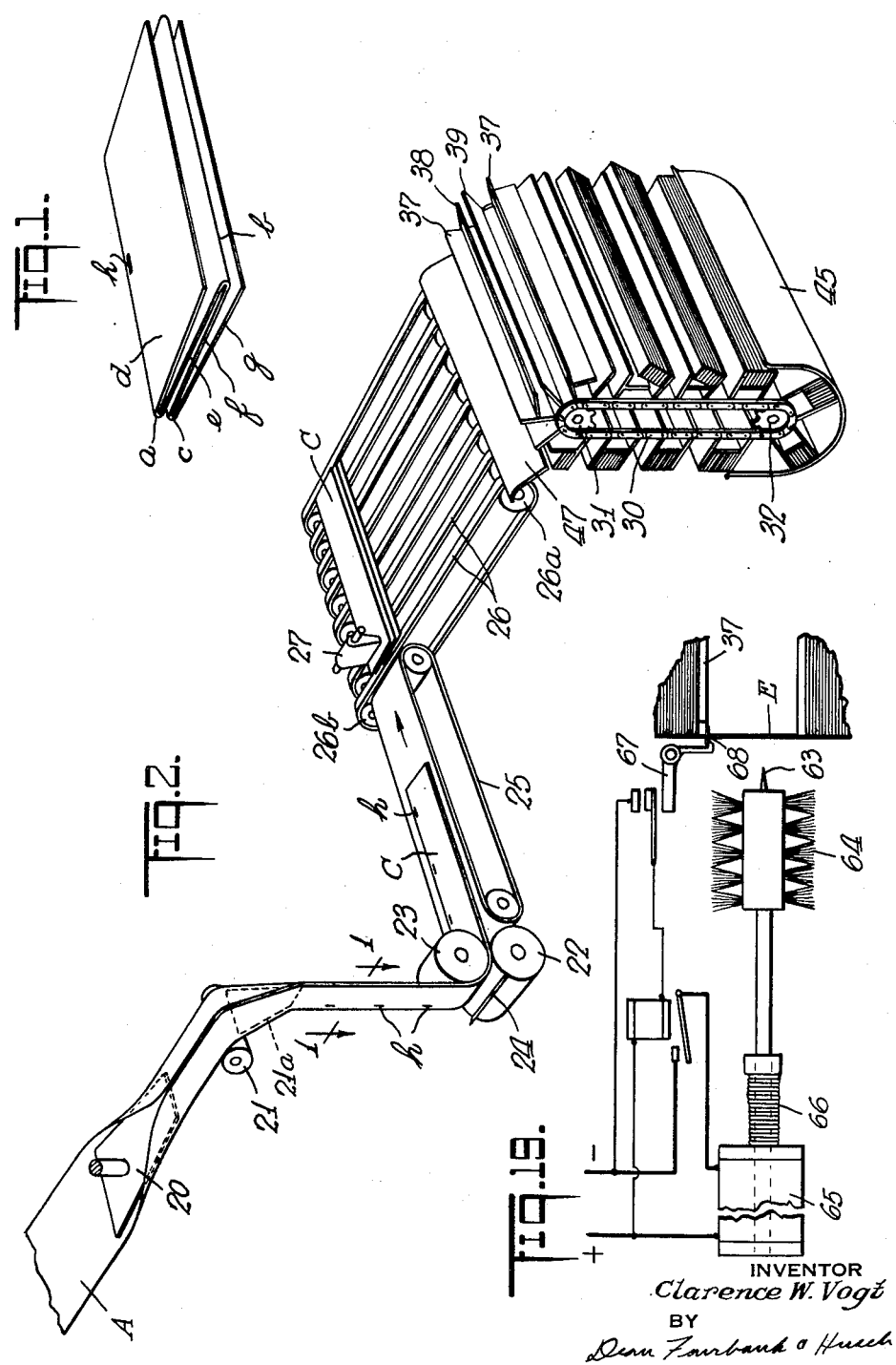
INVENTOR
Clarence W. Vogt
BY
Dean Fairbank & Hirsch
ATTORNEYS

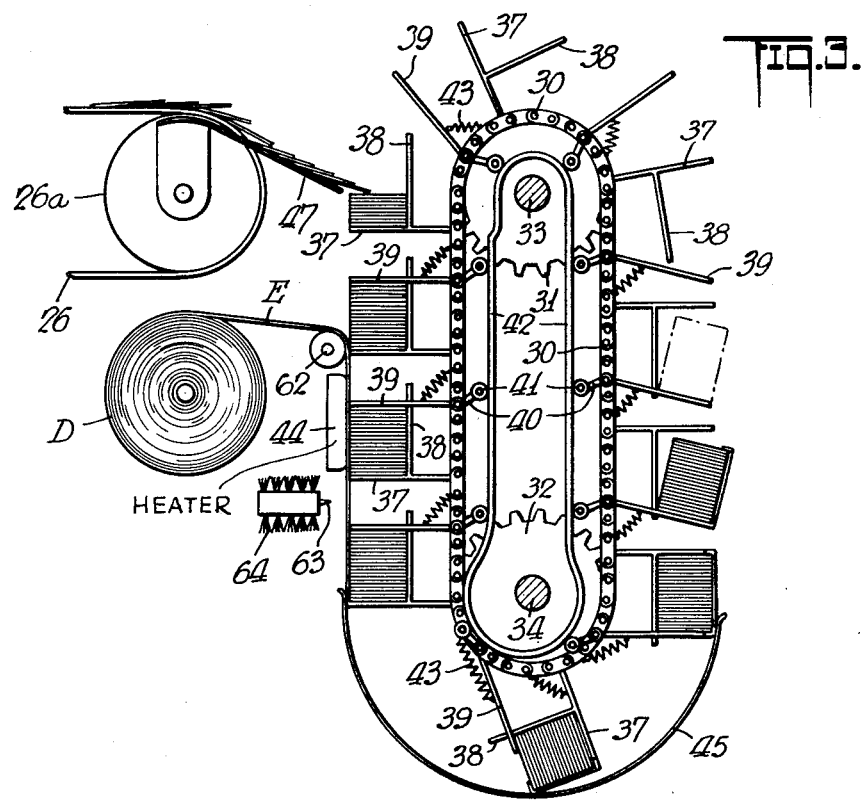
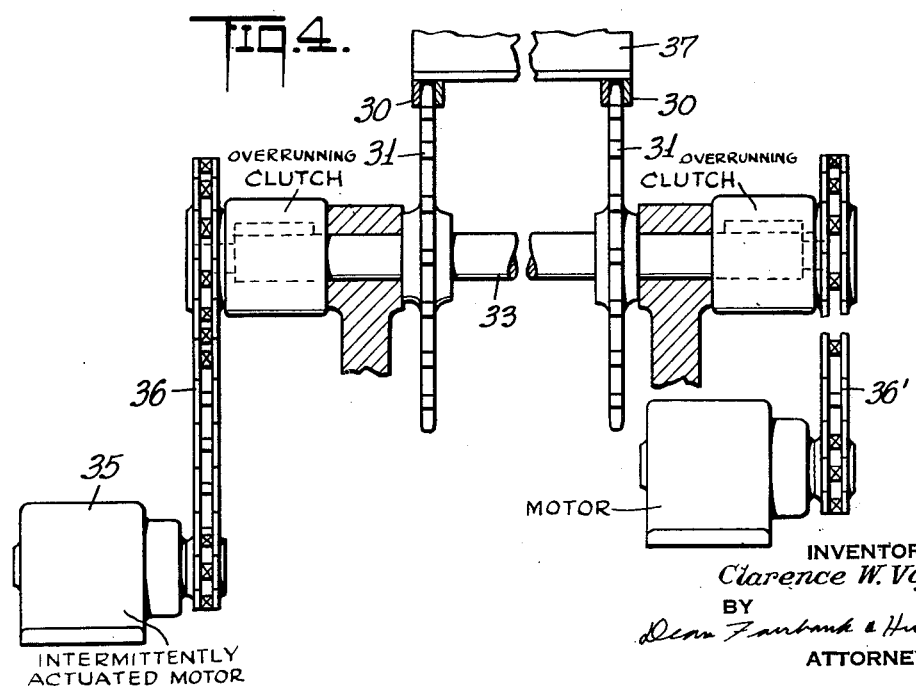

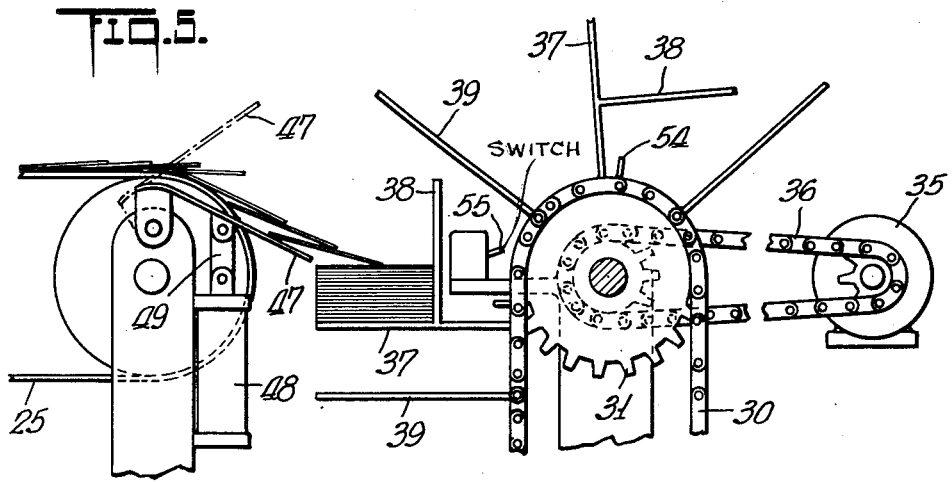
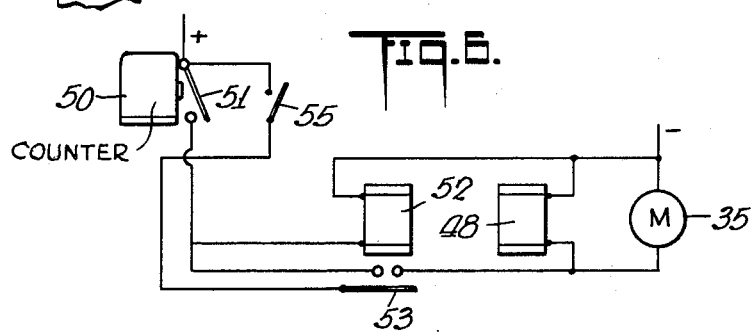
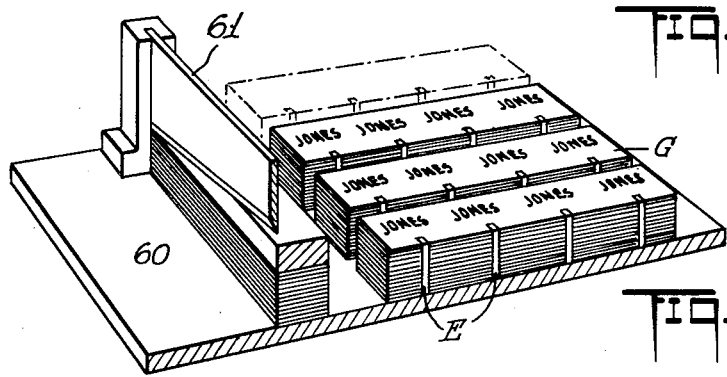
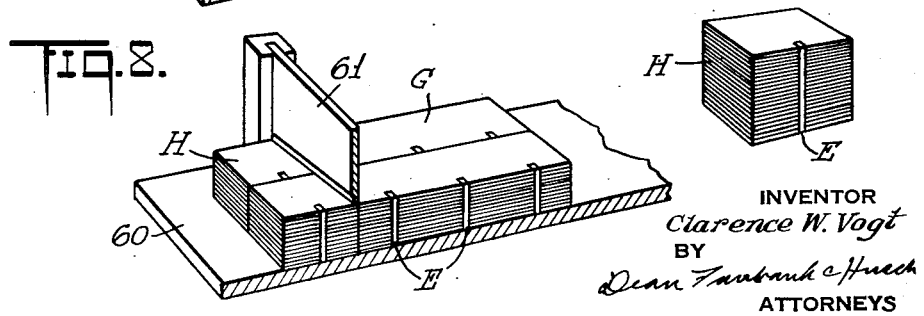

May 4, 1954  C. W. VOGT  2,677,317
METHOD FOR MAKING BUNDLES OF ENWRAPMENTS
Filed July 2, 1949  5 Sheets-Sheet 4
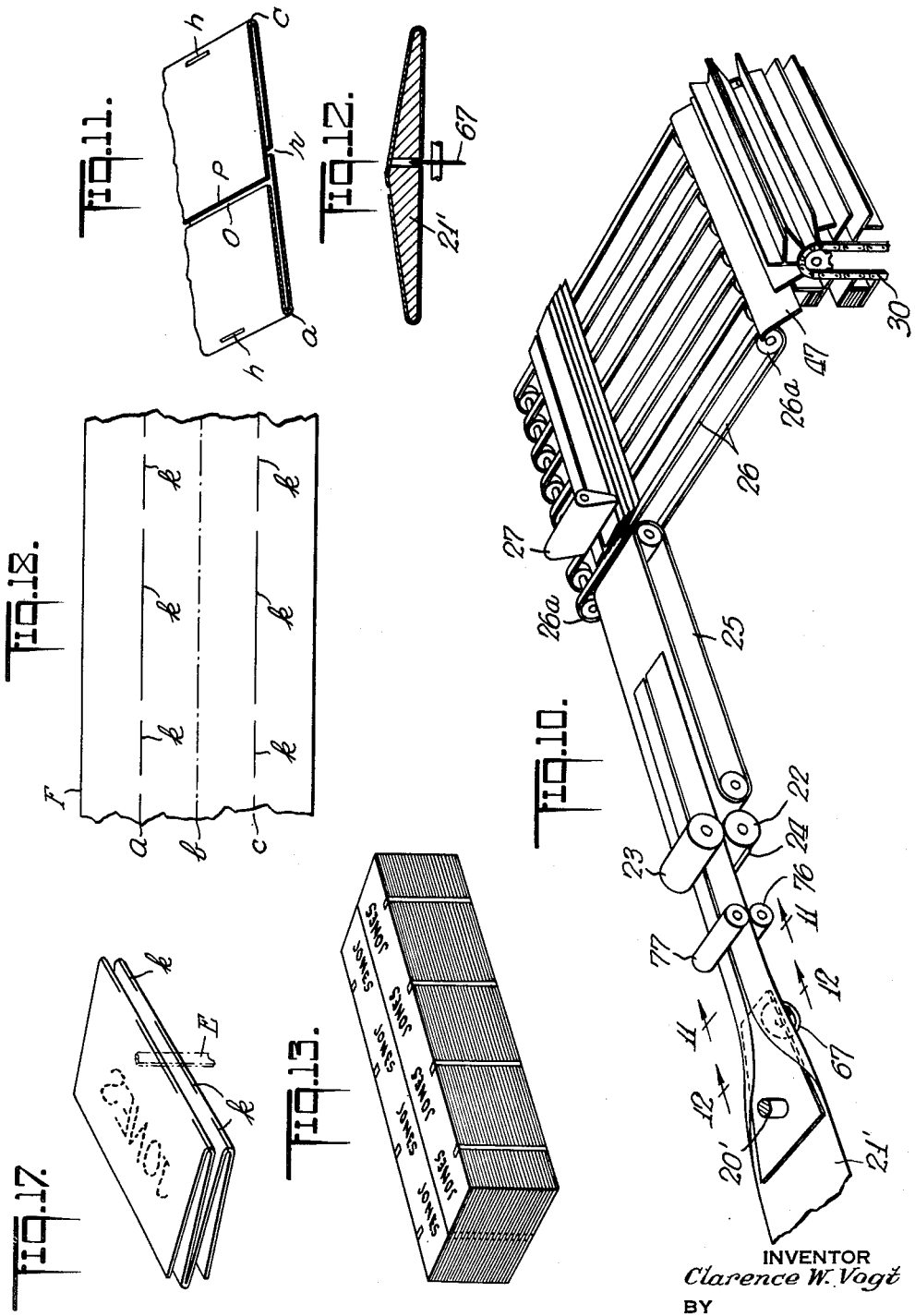
INVENTOR
*Clarence W. Vogt*
BY
ATTORNEYS May 4, 1954
C. W. VOGT
2,677,317
METHOD FOR MAKING BUNDLES OF ENWRAPMENTS
Filed July 2, 1949
5 Sheets-Sheet 5
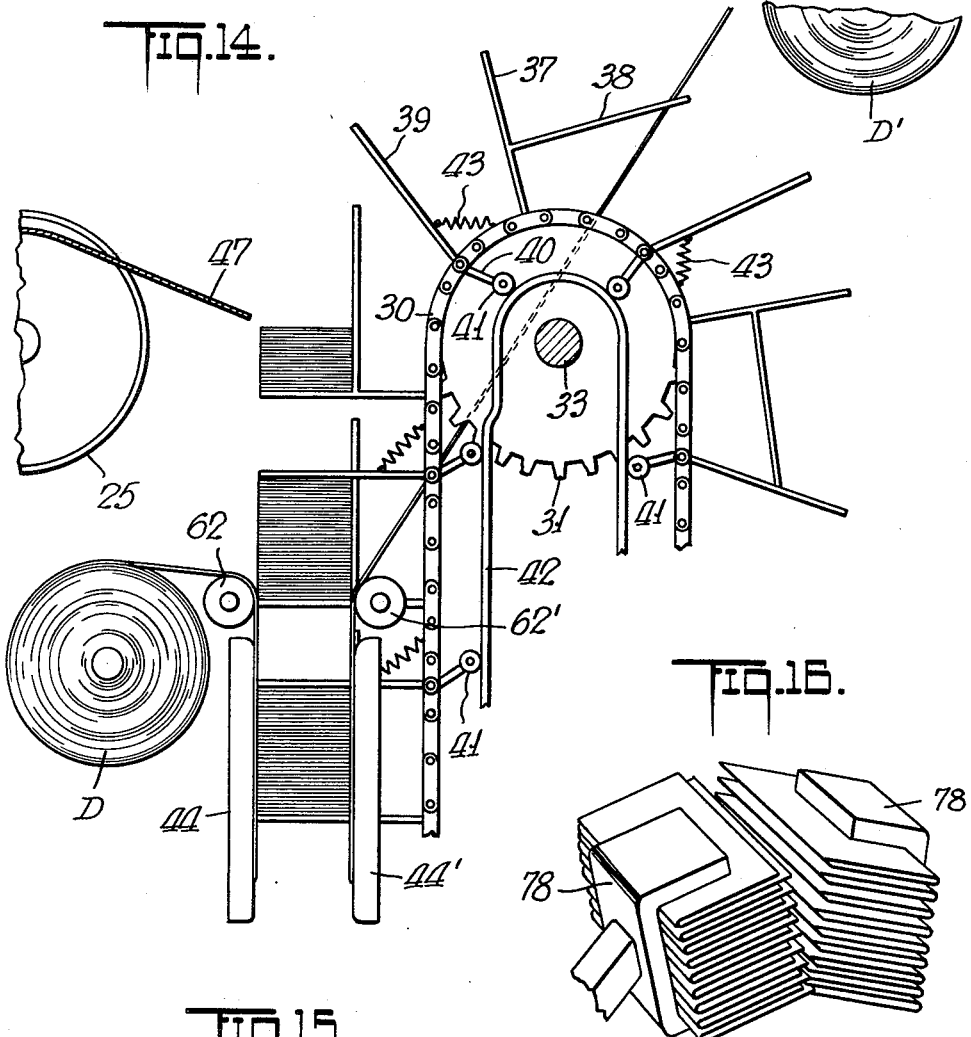
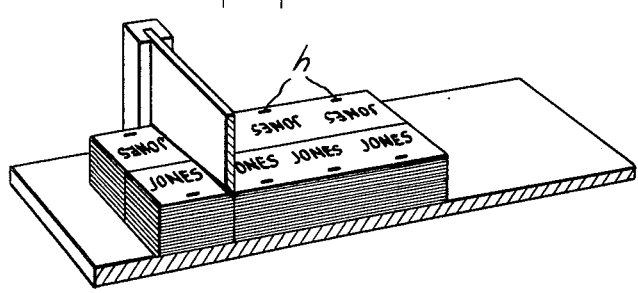
INVENTOR
Clarence W. Vogt
BY
Dean Fairbank & Hirsch
ATTORNEYS Patented May 4, 1954

2,677,317

UNITED STATES PATENT OFFICE 2,677,317

METHOD FOR MAKING BUNDLES OF ENWRAPMENTS

Clarence W. Vogt, Norwalk, Conn.

Application July 2, 1949, Serial No. 102,775

4 Claims. (Cl. 93—1)

In the packaging of units of various types of materials such as rectangular blocks of butter, margarine or other plastic material, an enwrapment may be employed in the form of a sheet slightly longer than the periphery of the unit to be packaged, so that after wrapping or folding around the unit, the opposite edges of the sheet may be overlapped and, if desired, connected together by adhesive.

My present invention relates to the manufacture of such enwrapments, each of which has a transverse fold line for registry with an edge of the article or unit to be enwrapped, and thus better insures the desired positioning of the overlapped edges and the proper positioning of the printed portions of the enwrapment in respect to the surfaces of the block, box or the like, to which the enwrapment is applied.

In my copending application Serial No. 90,304, filed April 29, 1949, now abandoned, I have disclosed and claimed enwrapments connected in series or as a chain, and a method of forming such a series or chain with one edge portion of each enwrapment detachably connected to an edge portion of the next successive enwrapment, whereby the chain of enwrapments may be folded to form a bundle or package, and the chain or series may be pulled out endwise in a form analogous to an accordion pleat.

In some types of wrapping machines or procedures it is desirable to prevent the bundle of enwrapments from opening out as an accordion pleat, and to hold the series of enwrapments in compact form as a bundle but still permit each enwrapment to be readily removed therefrom. In my present invention I accomplish this result by detachably connecting the folded enwrapments at or adjacent to their respective fold lines, instead of at or adjacent to their edges. The connecting means may include an adhesive of a readily peelable type, and this may be printed or otherwise applied to the sheet material before the latter is folded or cut, and so positioned that it will be on each enwrapment closely adjacent to the fold line to hold the enwrapments together in a bundle; or it may be on a tape applied across the fold lines of the enwrapments forming the bundle and adhering to the folded edge of each enwrapment. Thus the bundle may be more readily handled as such, and without liability of opening up or expanding, but the enwrapments may be easily removed in succession.

My present invention includes a method and apparatus whereby bundles of enwrapments may be effectively and efficiently formed from a continuous strip of paper or other sheet material, and when and if desired the enwrapments may be connected together while the bundles of enwrapments are being formed.

In carrying out my invention in its preferred form, a continuous sheet of the desired width is advanced endwise, progressively folded along a plurality of lines lengthwise of the sheet, cut into sections each of a length equal to a major dimension such as the width of one or more enwrapments, and such sections superposed to form stacks each containing a predetermined number of sections. These may then be adhesively connected in bundles, and thereafter the bundles may be cut transversely into shorter bundles each comprising a predetermined number of single enwrapments detachably connected at their superposed fold lines.

My invention includes the apparatus and the method of carrying out the successive steps.

The folded enwrapments as manufactured in accordance with the present invention may have four plies or layers, with the fold lines spaced in accordance with the widths of four sides of an article such for instance as a block of butter, margarine or other plastic material, or it may have two plies with a single fold line, and each ply of a width equal to or slightly greater than that of two adjacent faces of the article to be enwrapped.

A bundle of the first mentioned type of enwrapments may, if desired, be cut at the middle fold line to make two bundles of enwrapments of the second mentioned type.

Merely as examples of apparatus and method steps I have shown several different forms, but it will be understood that other embodiments may be made within the scope of my invention.

In the accompanying drawings:

Fig. 1 is a perspective view of a folded 4-ply enwrapment which, if desired, may be cut into a pair of 2-ply enwrapments.

Fig. 2 is a perspective view showing diagrammatically certain of the steps employed in making the 4-ply enwrapment.

Fig. 3 is an end view, partly in section, of a portion of the apparatus shown in Fig. 2, and on a larger scale and somewhat more in detail.

Fig. 4 is a sectional view of a part of the apparatus shown in Fig. 3.

Fig. 5 is similar to a portion of Fig. 3, but showing additional features for controlling the intermittent advancement or speeding up of the advancement of the bundles and controlling the number of enwrapments in each bundle.

Fig. 6 is a wiring diagram showing the control of the apparatus shown in Figs. 2 to 5 inclusive.

Fig. 7 is a perspective view showing how the multiple bundles may be cut to trim off the intermediate fold shown at the front edge of Fig. 1, and to produce two 2-ply multiple enwrapments from 4-ply multiple enwrapments.

Fig. 8 is a perspective view showing the cutter of Fig. 7 used to subdivide bundles of multiple enwrapments into bundles of single enwrapments.

Fig. 9 is a perspective view of a bundle of single enwrapments.

Fig. 10 is a somewhat diagrammatic perspective view of an apparatus for forming folded enwrapments having plies of unequal length.

Fig. 11 is a perspective view of the folded sheet cut on the line 11—11 of Fig. 10.

Fig. 12 is a transverse section on the line 12—12 of Fig. 10.

Fig. 13 is a perspective view of a bundle of multiple enwrapments as made by the apparatus shown in Figs. 10 and 11, and having tape connections.

Fig. 14 is a view somewhat similar to Figs. 3 and 5, but showing a modified construction.

Fig. 15 is a view similar to Fig. 8, but showing the cutting of enwrapments of the type shown in Fig. 11.

Fig. 16 is a view showing how the bundles, after being cut as shown in Fig. 15, may be pulled apart into separate bundles of single enwrapments.

Fig. 17 is a perspective view of a 4-ply folded enwrapment, and showing the sheet slitted to facilitate separation into single-ply enwrapments, and showing a tape for connecting the enwrapments in a bundle.

Fig. 18 is a plan view of a sheet before folding to form the enwrapment shown in Fig. 17, and Fig. 19 is a somewhat diagrammatic showing of the control for the operation of the tape cutter and wiper.

The specific method and apparatus hereinafter described and claimed may be employed for the manufacture of the 4-ply enwrapment shown in Fig. 1, and which is claimed as a new article of manufacture in my copending application Serial No. 100,944 filed June 23, 1949. This enwrapment is formed of a single sheet A folded along lines $a$, $b$ and $c$ to form four plies or sections $d$, $e$, $f$ and $g$. In using this enwrapment it may be opened up and folded in the opposite direction along the fold line $b$, and the four sections brought into engagement with the four faces of a rectangular article, or as hereinafter pointed out, the fold line $b$ may extend slightly beyond the adjacent edges of sections $d$ and $g$, and may be trimmed off in a plane defined by the vertical lines in Fig. 1, thereby to form two enwrapments, each with a single fold line.

The enwrapment may have one or more spots $h$ of adhesive adjacent to the fold lines $a$ and $c$. This adhesive is of a readily peelable type, and may be activated by applying pressure to the stack and/or heat to the side of the stack adjacent to the spots of adhesive, as hereinafter described. Such spots of adhesive are preferably applied to the sheet A, and in the proper places, before said sheet is folded or cut.

In Fig. 2 I have shown somewhat diagrammatically certain of the apparatus parts which may be employed in the method of forming the bundles of enwrapments of the type shown in Fig. 1, and in Figs. 3, 4 and 5 I have shown some of these parts in greater detail.

A sheet A of paper or other material suitable for making the enwrapments is advanced endwise from a roll or other suitable source of supply and past a folder 20, whereby the opposite edges are progressively folded over to substantially abut. The once-folded sheet is then again folded in a manner similar to that employed in connection with the folding of newspapers. As shown in Fig. 2, this involves passing it over a roller 21 and a folding apron 21a, and then between rollers 22 and 23 having their axes in a plane at right angles to a plane through the axis of the roller 21. In this way the sheet is folded as shown in Fig. 1.

The folded sheet is then cut transversely into sections C, each a multiple of the length of a single enwrapment. For this purpose the roller 23 may have a hardened surface and the roller 22 may have a knife blade 24 coacting therewith. The rows of spots $h$ of adhesive are so positioned that after the two folding steps these spots come adjacent to the fold lines $a$ and $c$. The sections C when cut off by the blade 24 are preferably on a belt conveyor 25 which delivers them endwise onto a second conveyor 26 extending in a direction at right angles to the direction of travel of the conveyor 25. This second conveyor 26 may be made of a plurality of narrow belts on pulleys 26a and 26b.

Any suitable means may be employed to stop the endwise movement of the sections C as they leave the conveyor 25, so that the ends of the successive sections C will be in alignment on the conveyor 26. This stop means is shown as a snubber 27 which is normally out of contact with the sections C, but which intermittently frictionally engages the rear end of each section C to stop its endwise movement and then immediately releases the section to permit its edgewise movement on the conveyor 26. This snubber may be an eccentric rotary one, or may be of any other suitable type.

The conveyor 25 preferably travels faster than the endwise movement of the sections C before the latter are cut off, so that when each section is cut off so that when each section is cut off it speeds up during its delivery onto the conveyor 26 and there is adequate time for this conveyor to move the section sideways to a distance less than the width of a folded enwrapment when the next enwrapment is delivered. Thus the enwrapments on conveyor 26 partially overlap, analogous to shingles, as they accumulate as shown in Fig. 3.

At the delivery end of the conveyor 26 the sections C are delivered into bundling apparatus, shown somewhat diagrammatically in Fig. 2, but more in detail in Figs. 3, 4, 5 and 14. As shown in Figs. 3 and 4, the bundler includes a pair of parallel chains 30 mounted on upper and lower sprockets 31 and 32 on the shafts 33 and 34. The shaft 33 with the sprockets 31 may be driven in any suitable manner, as for instance by a motor 35, and through a sprocket and chain connection 36.

Certain of the links of the chains 30 have rigidly connected thereto shelves or stack supports 37, and each of these has a back wall 38 at right angles thereto, and against which the folded sections C will engage as they are delivered in succession onto these supports 37, so that there will be formed neat stacks of the accumulated sections C with the fold lines $b$ against the vertical stops 38. By reason of the rigid connection of the supports 37 and links of the chains 30, the supports will be held parallel and horizontal while traveling down and up on the vertical runs of the chains 30.

Pressure plates 39 are pivotally connected to the chains and may have arm portions which may enter vertical slits in the upper portion of each back wall or stop 38 and permit each stack of sections C to be compressed on a support 37.

Means are provided whereby when the desired number of sections C have accumulated on a support 37 the stack is put under pressure by the application of the pressure plates 39. As shown, each pressure plate 39 has a lever arm 40 rigid therewith and provided with a roller 41 movable along a cam track 42 which is so shaped that when the stack supports are moving along the up run of the chains and over the upper sprocket 33, the pressure plates will be swung away from the stack support and held at an angle thereto.

When each stack support 37 receives its quota of section C at the upper end portion of a vertical run of the chains 30, the pressure plate 39 is in an upwardly inclined position. As the chains 30 move the support and stack downwardly, the roller 41 engages a portion of the cam track which causes the pressure plate to swing down onto the stack by the action of the roller 41 and the cam track 42.

As the sections C are delivered to the bundle former, the edge having the fold lines $a$ and $c$ is outermost, and therefore the adhesive spots $h$ are at the side away from the chains. As soon as each stack is formed and moves down, the stack passes a heater 44, and in close contact therewith, so that the heater activates the adhesive and causes the sections to become stuck together as a bundle, which at that time is under the pressure applied by the plate 39.

The cam track 42 is so formed that when the stack support reaches a position at approximately the elevation of the axis of the lower shaft 34, the cam track causes the roller 41 to move outwardly and hold the pressure plate 39 parallel to the supporting plate 37 and maintain the plates 37 and 39 parallel as they pass around the lower sprocket 32, and thus retain the bundle under pressure. Thus the bundle cannot fall out while going around the lower sprocket 32. To further insure against the bundle dropping out when below the lower sprocket, there may be provided one or more substantially semi-cylindrical guards 45.

When the bundle has reached a position at the other side of the sprocket it is supported on the pressure plate 39 instead of on the shelf 37, and at this point the cam track is extended in nearer to the lower shaft 34, and the plate 39 may move to a downwardly inclined position to liberate the bundle and permit it to slip off or be removed by hand or in any other suitable manner.

It will be noted that the bundle supports 37 are intermittently advanced by the motor 35 and through the chain 36. Preferably they are slowly advanced while sections are being delivered thereto keep the top of the stack in a fairly constant position in respect to the conveyor 26. For this purpose there may be provided a second chain 36′ continuously driven at low speed from a second motor. Over-running clutches between the shaft 33 and its driving sprockets permit the shaft 33 to speed up when driven from the chain 36, and permit the shaft to turn more slowly when the motor 35 is stopped. These over-running clutches include rollers shown in dotted lines in Fig. 4.

By means of the apparatus shown in Fig. 3 the folded enwrapments are collected in stacks and compressed into compact form, and the adhesive is activated to cause the enwrapments to become detachably connected together as bundles which are later removed from the conveyor.

As the conveyor 26 operates continuously and delivers the sections C in succession, and as it is desirable to have the same number of sections in each bundle, I provide means for interrupting the delivery of the sections onto the bundle former when the desired number have accumulated thereon and while the pressure plate is being lowered onto the stack and the stack is being lowered one step. For this purpose the sections are delivered from the conveyor 26 onto an inclined apron 47 down which they may slide and be pushed along in somewhat overlapped relationship, and onto the stack support or the stack thereon. For interrupting this transfer when the desired number of enwrapments have accumulated in the stack, the apron 47 is pivoted at its upper edge on the frame part supporting the pulley 26a of the belt conveyor 26, and means are provided for swinging the apron upwardly and interrupting the transfer of sections onto the stack. This means as shown in Fig. 5 includes a solenoid coil 48 with the solenoid core connected by a link 49 to the apron.

For controlling the operation of this solenoid when a predetermined number of sections have been cut off or delivered to the stack, and for advancing the bundle former intermittently, there are provided control parts connected as shown in the wiring diagram, Fig. 6. A counter 50 may be mounted at any suitable position on the machine, as for instance on or connected to the shaft of the cutter 23, and acts to momentarily close and then open a switch 51 when the desired number of sections has been cut off and delivered to the conveyor belt 26.

The momentary closing of the switch 51 by the counter permits current to flow to the holding coil 52 of a relay. The energizing of this coil 52 closes a switch 53 so that current may flow through a normally closed switch 55 and the switch 53, which has been closed by the energizing of the relay coil 52. It also flows through the solenoid coil 48 to tilt the apron 47 upwardly, and through the motor 35 which operates the chains 30 and the bundle supports carried thereby. The motor advances the chains and bundle carrier at a much faster rate than they were being advanced by the chain 36′ and its motor. The stacks will then move downwardly rather rapidly, and this movement will continue while sections are accumulating on the apron 47 which will then be in the upper position, as shown in dotted lines in Fig. 5.

One of the chains carries projections 54, one adjacent to each stack support 37, and when the stack has been moved down one step it will engage the switch 55. This breaks the circuit to the coil 52, solenoid 48 and motor 35, and the next support 37 will then be in position to receive the sections which slide down the apron. Due to momentum the parts will coast along for a short distance and the switch 55 will snap back to closed position, but in the meantime the switch 53 has opened and will not close again until the counter-controlled switch 51 is closed. Thus the motor 35 is operated to advance a stack each time a predetermined number of the sections has been cut off, and when the next successive stack support comes into proper position to receive the sections from the apron 47 the apron is lowered by the de-energizing of the coil 48, and the sections accumulated on the apron may slide down onto the support or stack carrier 37. During the building up of the stack the chains are advanced at a slow rate, equivalent to that at which the stack increases in height.

Instead of connecting the folded enwrapment sections by spots $h$ of adhesive, as above described, they may be connected by a plurality of sections of tape corresponding in number to the number of bundles into which a bundle of multiple enwrapments is to be cut. In Fig. 3 I have shown means for applying the tape, but it will be understood that these parts need not be used if the adhesive spots $h$ be present on the sheets. A plurality of rolls D of adhesive coated tape are mounted on a suitable support, and the tapes E are passed over a roller 62 disposed close to the outer side of the path of movement of the stacks and stack supports 37. The tapes adhere to the enwrapments across the fold lines $a$ and $c$, and are pressed against the stacks by the roller 62 and the heater 44, so that as the stacks are intermittently lowered the tapes E are pulled from the roll D, by its adherence to the enwrapments, and bridge across the space between the stacks.

Below the heater 44 there is positioned a combined tape cutter 63 and wiper 64. This is mounted in any suitable manner to move back and forth intermittently. For instance, as diagrammatically shown in Fig. 19, it may be connected to the core of a solenoid 65 and be normally pulled to and held in the outer position by a tension spring 66. A switch 67 may have a light operating arm with a cam end disposed in the path of movement of a projection 68 on each of the stack supports 37. As the stack support 37 moves down to a suitable point below the heating and tape attaching position, the projection 68 closes the switch 67 to close a circuit through a relay to the solenoid 65. The solenoid then rapidly moves the cutter and wiper in to cut the tapes and apply the ends to the bundles. As the projection 68 on the stack support 37 slips past the end of the switch operating arm the weighted or spring actuated switch drops by gravity to open the relay circuit and thus open the circuit of the solenoid, and the spring 66 pulls the wiper and cutter back to the position shown in Fig. 3.

The cutter and wiper are positioned below the heater, so that after the tapes are attached to the edges of a bundle G of the multiple enwrapments, the cutter 63 moves inwardly to sever the tapes midway between bundles. The wipers 64, which may be in the form of brushes, will wipe the free ends of the tapes inwardly and cause one end of the tapes to be attached to the lower side of the bundle above, and the other end of the tape section to be attached to the upper side of the bundle therebeneath. It will be understood that there are as many tapes and tape rolls as there are individual enwrapment widths in each section of a multiple enwrapment bundle G.

It will also be understood that there may be as many tape cutters 63 and wipers 64 as there are tapes, but there may be only one, and of a length approximately the length of the multiple enwrapment bundles.

A plurality of the bundles G, after removal from the bundle former shown in Fig. 3, may be placed on the guillotine cutter 61 employed to trim off the fold line $b$ as above described and as shown at the left of Fig. 7, and then turned around on the table 60 to present an end toward the cutter, as shown at the right of Fig. 7. A plurality of the bundles G may then be advanced endwise, as shown in Fig. 8, and cut into bundles H of individual enwrapments, as shown in Fig. 9.

In some cases it is desired to make folded enwrapments in which the fold line is not midway between the opposite edges, in other words, the portion of the enwrapment at one side of the fold line is wider than that at the other. In Fig. 11 I have shown a strip folded so that the abutting edges $o$ and $p$ are not midway between the fold lines $a$ and $c$. Such a strip may be made by means of the apparatus shown in Fig. 10, which in many respects is similar to that shown in Fig. 2. The folder 20' is non-symmetrical, so that one edge is folded over to a greater extent than is the opposite edge. The folded sheet may then pass between feed rollers 76 and 77 which deliver to the cutter 24, which may be substantially the same as shown in Fig. 2. The folder 20' is provided with a slot, and through this extends a cutter 67 which will divide the sheet lengthwise along a line $r$ out of registry with the substantially abutting edges $o$ and $p$. Thus the wider portion of one multiple length section will overlap the wider portion of the other section.

These multiple length sections may be fed to and accumulated in the bundle former, but in this modification it is desirable to apply connecting tapes along both of the fold lines $a$ and $c$, which in Fig. 11 are at opposite edges.

In Fig. 14 I have shown an apparatus very similar to that shown in Fig. 3, except that there are provided two rolls D and D' of tape, two of the rollers 62 and 62', two of the heaters 44 and 44', and two of the tape cutters and wipers. The resulting bundle will be made up of a plurality of superposed sheets, as shown in Fig. 11, and because of the pressure applied in the bundle former and the overlapping of the edges of the longer sides of the enwrapments, the bundle will constitute a single entity, but the two halves may be pulled apart, particularly if they be slightly tilted in respect to each other during such pulling.

The multi-length sections would appear as shown in Fig. 13, although obviously instead of using the tapes, spots of adhesive might be employed. The bundle shown in Fig. 13 may be cut transversely by a guillotine cutter as shown in Fig. 15, although in Fig. 15 the enwrapments are shown as having spots of adhesive instead of tapes.

In Fig. 16 I have shown a pair of clamping jaws 78 which may grip the opposite sides of each bundle after it has been cut off as shown in Fig. 15. These may be hand or power operated, so that upon tilting the clamps the two individual bundles will be readily separated, but the individual enwrapments of each bundle will be held together by the adhesive at the fold lines, and either on the sheet or on tapes, as above described.

The process and apparatus above described may be employed for making labels as illustrated in Figures 17 and 18, in which case a sheet F may be employed which has slits $k$ along the fold lines $a$ and $c$, so that after the bundle has been made as above described and the fold line $b$ trimmed off and the bundle cut into sections as shown in Figs. 8 and 15, the pairs of labels may be fed between pairs of bottles, boxes or other articles, and have adhesive on the outer faces, as shown in Fig. 7 of my application Serial No. 100,944, filed June 23, 1949. As the two labels are applied they are severed or torn apart along the slitted lines $k$. In Fig. 17 I have shown a perspective view similar to Fig. 1, but with the slits $k$ and a portion of the connecting tape E.

Having thus described my invention what I claim as new and desire to secure by Letters Patent is:

1. The method of making chained enwrapments having at least one fold parallel to the ends thereof between adjacent sides, the sides being openable about the folds, comprising the steps of progressively folding over opposite edge portions of an advancing web, cutting the folded web transversely of the length thereof to form multiple enwrapments, at any stage applying adhesive material to the enwrapments adjacent the folded edge thereof, stacking the folded enwrapments into bundles, cutting the bundles transversely of the folds of the enwrapments, detachably adhering the adhesive material to the opposing face of an adjacent enwrapment.

2. The method of making chained enwrapments having at least one fold parallel to the ends thereof between adjacent sides, the sides being openable about the folds, comprising the steps of progressively folding over opposite edge portions of an advancing web, again folding the web midway between the first named folds, cutting the folded web transversely of the length thereof to form multiple enwrapments, at any stage applying adhesive material to the enwrapments adjacent one of the first named folded edges thereof, stacking the folded enwrapments into bundles, cutting the bundles transversely of the folds of the enwrapments, and detachably adhering the adhesive material to the opposing face of an adjacent enwrapment.

3. The method of making chained enwrapments having at least one fold parallel to the ends thereof between adjacent sides, the sides being openable about the folds, comprising the steps of progressively folding over opposite edge portions of an advancing web, cutting the web longitudinally thereof and in a plane closer to one fold than to the other, cutting the folded web transversely of the length thereof to form multiple enwrapments, stacking the folded enwrapments into bundles, detachably adhering the enwrapments of each bundle together adjacent the folds thereof, and cutting the bundles transversely of the folds of the enwrapments.

4. The method of claim 3, wherein the first named folds are formed at different distances from the edges of the web and wherein the first named cutting operation is performed upon the web at a point beneath the longest folded portion of the web.

References Cited in the file of this patent

UNITED STATES PATENTS

| Number | Name | Date |
| --- | --- | --- |
| 525,536 | Corbett | Sept. 4, 1894 |
| 1,653,908 | Hunt | Dec. 27, 1927 |
| 1,815,372 | Frazier | July 21, 1931 |
| 1,844,516 | Meyer | Feb. 9, 1932 |
| 1,915,376 | Moone | June 27, 1933 |
| 2,069,397 | Von Barth | Feb. 2, 1937 |
| 2,224,513 | Holmlund | Dec. 10, 1940 |
| 2,265,609 | Milmoe et al. | Dec. 9, 1941 |
| 2,280,092 | Kirch et al. | Apr. 21, 1942 |
| 2,324,834 | Gurwick | July 20, 1943 |
| 2,444,685 | Waters | July 6, 1948 |